Jan. 11, 1949.  L. W. HUSSEY  2,458,599
CIRCUIT FOR SAMPLING BALANCED SIGNALS
Filed Dec. 4, 1946

SWITCHING PULSES AND BIAS

INVENTOR
L. W. HUSSEY
BY
*George Ford*
ATTORNEY

Patented Jan. 11, 1949

2,458,599

UNITED STATES PATENT OFFICE 2,458,599

CIRCUIT FOR SAMPLING BALANCED SIGNALS

Luther W. Hussey, Madison, N. J., assignor to Bell Telephone Laboratories, Incorporated, New York, N. Y., a corporation of New York Application December 4, 1946, Serial No. 714,088

12 Claims. (Cl. 250—27)

This invention relates to signaling circuits arranged to sample the instantaneous amplitude of a wave at chosen instants. Circuits of the type contemplated herein are sometimes known as "clamps" and are arranged to maintain or hold a voltage proportional to a sampled amplitude during the interval between sampling operations.

In general, such circuits comprise a storage capacitor, connected through a variable resistor to the source of the wave to be sampled, together with certain control means. If, at a particular instant, the resistance presented by the variable resistor is made small, the capacitor is charged to a value representing the amplitude of the wave at that time. When the resistance presented by the variable resistor is made very large, the charge on the capacitor is held or "clamped" until the resistance is again returned to the lower value. When the resistance is again made small the capacitor is permitted to charge or discharge as necessary until the potential across it is again equal to the amplitude of the wave applied to the circuit at that time.

Ordinarily the variable resistances employed in such circuits comprise a pair of vacuum tubes connected back-to-back to permit two-way transmission between the storage capacitor and the source of the wave to be sampled. These tubes are changed from the non-conducting or high resistance condition to the conducting or low resistance condition by switching or sampling signals or pulses applied from a suitable source. Since the voltage across the capacitor varies with or follows the wave applied to the circuit during the conducting periods and is held at the voltage present at the conclusion of each conducting period during the succeeding non-conducting period, such circuits find application as sampling devices in many electronic and communication systems of the type in which the instantaneous amplitude of a complex wave is periodically expressed by a code or other type of signal.

It has been found, however, that the performance of clamping or sampling circuits of the type described above tends to deteriorate as the sampling frequency is increased, the storage capacitor being unable to hold the sampled voltage during the non-conducting periods. Such decreases in performance are due to the fact that circuits of this type include a relatively complex circuit network comprising at least a pair of vacuum tubes with associated circuit elements, and this network cannot be grounded. This condition results in the presence of numerous parasitic or leakage capacitances. For example, the interelectrode capacitances of the vacuum tubes introduce transmission paths through which the storage capacitor may charge or discharge during the storage or non-conducting intervals. Thus, the potential across the storage capacitor may tend to follow the input signal during the non-conducting intervals or the charge on the capacitor may leak off so that the voltage thereacross does not remain constant during the periods of non-conduction.

Attempts have been made to overcome such difficulties by employing compensating capacitances to provide a transmission path such that any potential change due to transmission through parasitic capacitances is balanced by a similar potential change of reverse phase through a compensating transmission path. The use of such compensating capacitors sets a lower limit on the amount of capacitance in the circuit, and this together with the minimum resistance value obtainable in the vacuum tubes employed as switching tubes establishes a time constant which limits the frequency at which the circuit may be operated. The value of this type of circuit for high speed sampling operation is thus seriously impaired.

It is an object of the present invention to provide a sampling circuit capable of higher operating speeds than those attained in the usual sampling circuit.

It is a further object of the invention to provide a sampling circuit such that throughout the storage period the stored voltage constitutes an accurate representation of the voltage existing at the time of sampling.

The above objects are accomplished in accordance with the present invention through the use of a sampling circuit for operation upon balanced complex wave signals. These signals are applied to the grids of a pair of push-pull tubes and the storage capacitor is connected between the cathodes of these tubes. The tubes are normally cut off and means are provided to prevent the charge of the storage capacitor from changing during the cut-off intervals. Sampling signals are applied to the grids of both tubes at predetermined intervals to render the tubes conductive and to permit the charge on the storage capacitor to vary with variations in the balanced input signal.

The above and other features of the invention will be described in the following detailed specification taken with the drawings in which.

Figure 1:
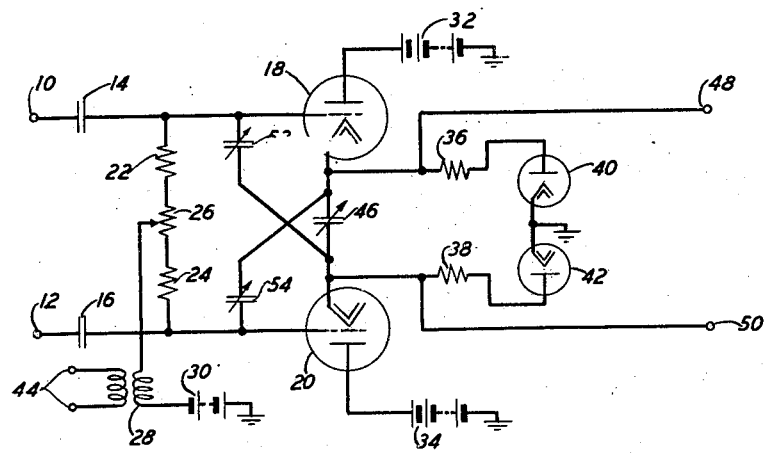
Fig. 1 is a circuit diagram of a sampling circuit in accordance with the invention.

The circuit schematic of an illustrative embodiment of the invention is shown in Fig. 1. In this circuit, the wave form to be sampled is applied as a balanced signal between terminals 10 and 12, and thence through capacitors 14 and 16, respectively to the control grids of switching tubes 18 and 20. It will be noted that this circuit is arranged for a balanced input signal. If the wave form to be sampled is available as a single-sided signal, it may be applied through a transformer or other phase-inverting device, as for example, the vacuum tube circuit known as a cathode-coupled paraphase amplifier or cathode phase inverter and described in detail at page 137 of "Theory and Application of Electron Tubes," second edition by H. J. Reich, to obtain a balanced signal.

Returning now to the details of the circuit arrangement, switching tubes 18 and 20 are shown herein as triode-type vacuum tubes, although multigrid tubes such as pentodes may be employed as required to obtain a desired output.

The grids of switching tubes 18 and 20 are connected through grid resistors 22 and 24 respectively, to the opposite ends of the winding of a potentiometer 26, the variable contact of which is connected through the secondary winding of a transformer 28 to the negative terminal of a bias battery 30 the positive terminal of which is grounded. The anodes of the switching tubes are connected respectively to sources of positive potential shown herein as batteries 32 and 34 while the cathodes are connected respectively through series resistors 36 and 38 to the anodes of rectifiers 40 and 42 shown herein by way of example as comprising diode-type vacuum tubes. Other types of tubes or other types of rectifiers, as for example copper-oxide rectifiers, may be used providing the resistance offered in the non-conducting state is sufficiently high to prevent leakage of the charge from the storage capacitor. The cathodes of these rectifiers are connected together and to ground. Provision is made for the application of switching signals or pulses to the control grids of the switching tubes, these pulses being applied from terminals 44 through transformer 28, potentiometer 26 and series resistors 22 and 24 respectively, to the grids of the two switching tubes. A storage capacitor 46 of suitable value (for example, between 30 and 100 micromicrofarads for a sampling rate of one megacycle) is connected between the cathodes of the two switching tubes. Leads to output terminals 48 and 50 are connected respectively to opposite sides of the storage capacitor. Compensating capacitors 52 and 54 are cross-connected between the grids and cathodes of the switching tubes, the grid of tube 18 being connected through capacitor 52 to the cathode of tube 20 and the grid of tube 20 being connected through capacitor 54 to the cathode of tube 18.

Considering the operation of the sampling circuit described above, it will be recalled that three separate voltages are applied to the circuit. The first of these is a negative bias voltage from battery 30 which is applied through potentiometer 26 and resistors 22 and 24 respectively, to the grids of switching tubes 18 and 20. This negative bias is of sufficient amplitude to cut off both of these switching tubes in the presence of the greatest complex wave amplitude to be applied between terminals 10 and 12 and to maintain the tubes cut off at all times during the interval between sampling pulses.

The second of the applied voltages comprises a series of switching pulses applied through transformer 28 from terminals 44 to the grids of both of the switching tubes through the same midtap connections as those employed for the negative bias voltage. Such pulses may be obtained from any suitable source, as for example, from a blocking oscillator, and transformer 28 may be of the type designed to sharpen the pulses applied thereto. These pulses are positive in polarity and are of amplitude sufficient to maintain both switching tubes conductive in the presence of both the negative bias voltage and the greatest possible negative amplitude of the complex wave to be sampled. These pulses are shown superimposed upon the negative bias voltage by curve 52 in Fig. 2 of the drawings.

The third of the applied voltages is that corresponding to the complex wave to be sampled. It will be recalled that this wave is applied as a balanced signal through capacitors 14 and 16 respectively, to the grids of switching tubes 18 and 20. Since this is a balanced signal it will appear in opposite phase on the control grids of these switching tubes. The signal appearing at the grid of switching tube 18 is indicated by solid curve 54 of Fig. 2 while that applied to the grid of switching tube 20 is indicated by the dashed curve 56 of Fig. 2.

It is convenient to consider the operation of the sampling circuit of the invention by first assuming the conditions of operation in which no complex wave is applied to the switching tubes from terminals 10 and 12. Under these conditions the only applied voltage is that represented by the superimposed pulse and bias inputs as shown by curve 52 of Fig. 2. During the intervals between switching pulses the negative bias from battery 30 is sufficient to cut off the flow of current through both of switching tubes 18 and 20. Since under these conditions rectifiers 40 and 42 are also non-conductive, the plates and cathodes thereof being at the same potential, the voltage across capacitor 46 cannot change. Of course under the present assumption there will be no voltage across the capacitor 46 unless there is a charge from a previous operation, as no charge can be accumulated in the presence of the bias voltage alone. This condition of no change in the capacitor voltage during the intervals between pulses also holds for the normal operation with an applied complex wave as will appear from the later discussion.

Figure 2:
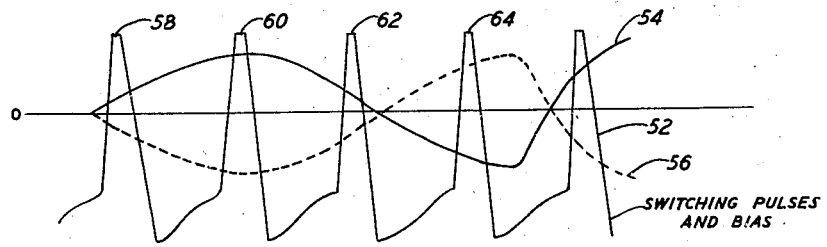
Fig. 2 is a graph of typical voltages applied to various portions of the circuit of Fig. 1 plotted on a common time base.

During each of the sampling periods, however, and as shown by curve 52 of Fig. 2, a positive pulse is applied to the grids of the two switching tubes. Upon the application of these pulses, both of switching tubes 18 and 20 are driven into conduction. Since the cathodes of the switching tubes become positive upon the initiation of current flow, rectifiers 40 and 42 respectively, become conductive, completing the current paths from batteries 32 and 34 to ground through the switching tubes. Within the variations between two tubes of the same type the currents through switching tubes 18 and 20 are equal, so that their cathodes will reach substantially equal positive potentials during the sampling pulses. If this condition does not obtain, potentiometer 26 is adusted until the cathodes operate at the same potential during the sampling intervals in the absence of applied complex wave. Under these conditions it will be observed that no potential difference is set up across storage capacitor 46 and that accordingly no charge is accumulated therein. If this adjustment is to be made after the circuit has been in normal operation the capacitor 46 must of course be first discharged.

Figure 3:
Fig. 3 is a graph on the same time base as the graph of Fig. 2 showing the variations in sampled voltage in the circuit of Fig. 1 in response to the applied voltages of Fig. 2.

Let it now be assumed that a complex wave form as shown by curve 54 of Fig. 2 is applied to the circuit as a balanced signal, the potential variation at the grid of switching tube 18 due to this signal being as shown in curve 54 while that at the grid of switching tube 20 is the inverse of this signal as shown by curve 56. Since between sampling pulses the negative bias furnished by battery 30 is sufficient to maintain the switching tubes at cut off or below even in the presence of the maximum signal amplitude of the complex wave, it will be apparent that in the intervals between sampling pulses no current will flow through switching tubes 18 and 20 in response to the application of a complex wave form. During the first sampling pulse 58 (Fig. 2), however, this negative bias is overcome and the switching tubes are rendered conductive. It will be noted from curve 54 that during the application of the first sampling pulse a positive voltage appears at the grid of switching tube 18 is response to the applied complex wave form and that at the same time a negative voltage of equal amplitude appears at the grid of switching tube 20. Under these circumstances the grid of switching tube 18 becomes more positive during the sampling interval than it would in the absence of the complex wave signal while the grid of switching tube 20 becomes correspondingly less positive. Since both of these tubes are conducting due to the sampling pulse however, and since rectifiers 40 and 42 are conductive, switching tubes 18 and 20 tend to operate as cathode followers, the cathode potentials tending to follow those applied to the respective grids. Accordingly, a potential is developed across storage capacitor 46, electrons tending to flow from the upper plate thereof through switching tube 18 and battery 32 to ground, thence through rectifier 42 and series resistor 38 to the lower plate of capacitor 46. At the conclusion of the sampling pulse switching tubes 18 and 20 are again cut off and rectifiers 40 and 42 become non-conductive. Thus the charge accumulated on capacitor 46 is trapped and a corresponding potential is maintained thereacross appearing between the output terminals 48 and 50. This potential, which is shown by the first step of the curve of Fig. 3, is representative of the amplitude of the complex wave applied to the grids of the switching tubes at the instant the first sampling period was terminated.

Due to the fact that switching tubes 18 and 20 have a finite and irreducible grid-cathode interelectrode capacitance, provision is made to prevent change of potential between the cathodes of these tubes in response to variation in the applied complex wave signal during the interval in which switching tubes 18 and 20 are cut off. Compensating capacitors 52 and 54 cross-connected between the grids of the switching tubes and the cathodes thereof, are provided for this purpose. Thus, if as shown by curve 54, the complex wave amplitude rises during the interval between the first and second sampling pulses, there is a tendency due to the interelectrode capacitance of the tubes for the cathode of switching tube 18 to become more positive and that of switching tube 20 to become less positive. This would result in a change in the charge on storage capacitor 46. It will be noted that due to the cross-connection of compensating capacitors 52 and 54, whenever the cathode of switching tube 18, and thus the upper plate of capacitor 46, becomes more positive in response to an increase in the complex wave amplitude, a similar increase in potential is produced at the lower plate of capacitor 46 by virtue of the connection through capacitor 52. Similarly when the cathode of switching tube 20 becomes less positive in response to the same increase in complex wave amplitude, a compensating potential is applied to the upper plate of capacitor 46 through compensating capacitor 54. Thus the voltage across storage capacitor 46 is maintained accurately at the value of the complex wave when last sampled.

Continuing with the operation of the circuit in response to the voltages shown in Fig. 2, it will be seen that at the time of the second sampling pulse 60 the applied complex wave has reached a higher value. Accordingly the current through switching tube 18 will be increased while that through switching tube 20 is decreased beyond those currents which flowed during the first sampling pulse. Thus the cathode of switching tube 18 becomes more positive and that of switching tube 20 less positive than they were at the time that the first sample voltage was developed across capacitor 46. As a result, there is an additional flow of electrons from the upper plate of capacitor 46 to the lower plate thereof through the external circuit including tube 18, battery 32, rectifier 42 and resistor 38. As the conclusion of the second sampling pulse therefore, the voltage across capacitor 46 has increased to the value shown by the second step of the curve of Fig. 3.

At the time of the third sampling pulse 62 however, the complex wave amplitude has fallen to a value less than that which obtained at the time of either the first or second sampling pulses. Therefore, the potential difference between the cathodes of switching tubes 18 and 20 tends to become less than that across capacitor 46 at the conclusion of the second sampling pulse and electrons flow from the lower plate of capacitor 46 to the upper plate thereof through a circuit including switching tube 20, battery 34 to ground, rectifier 40 and resistor 36, until the capacitor has discharged to the lower potential difference indicated by the third step of the curve in Fig. 3.

Finally, at the time of the fourth sampling pulse 64 the complex wave amplitude is of negative polarity. Thus the potential applied to the control grid of switching tube 18 becomes very much less positive than it would be even in the absence of applied complex wave signal, while the potential at the control grid of switching tube 20 becomes much more positive than it would in the absence of applied complex wave signal. As a result the potential between the cathodes of these tubes tends to reach the condition in which the cathode of switching tube 20 is considerably more positive than that of switching tube 18. This tendency requires a reversal of the potential due to the charge stored by capacitor 46. Accordingly electron flow takes place from the lower plate of capacitor 46 to the upper plate thereof through the external circuit including switching tube 20, battery 34, rectifier 40 and resistor 36 with the ultimate result that the voltage across capacitor 46 at the termination of the switching or sampling pulse 64 reaches the value shown by the fourth step of Fig. 3.

It will be seen from examination of the stepped curve of Fig. 3 and comparison thereof with the curves of Fig. 2 that the voltage across storage capacitor 46 and thus across the output terminals 48 and 50 of the sampling circuit is of step form, each step representing the amplitude of the applied complex wave at the time of a sampling pulse, these amplitudes being held at their last value during the interval between sampling pulses. Thus by a suitable adjustment of the pulse recurrence frequency of the sampling signal, the variations in amplitude of the complex wave may be represented in step form to any desired degree of granularity.

What is claimed is:

1. In a circuit for operating upon balanced signals, a pair of electron tubes eaching having at least anode, cathode and control grid elements, a source of anode potential connected between said anodes and ground, a capacitor connected between said cathodes, connections between said cathodes and ground arranged to permit current flow to said capacitor only when the corresponding tube is conducting, means for applying said balanced signals between the grids of said tubes, means for maintaining the space currents of said tubes normally cut off in the presence of said balanced signals, means for rendering said tubes conductive at predetermined instants, and output connections from each side of said storage capacitor.

2. In a sampling circuit for operating on balanced signals, a pair of electron tubes each having at least an anode, a cathode and a control grid, a source of potential connected between said anodes and ground, a storage capacitor connected between the cathodes of said electron tubes, means effective to permit current flow to said storage capacitor only when the cathode of at least one of said tubes is positive with respect to ground, means for maintaining the space current of the electron tubes normally cut off, and means for rendering said tubes conductive at predetermined instants.

3. In a circuit for sampling the amplitude of balanced signals, a pair of electron tubes each having at least anode, cathode and control grid elements, a source of potential connected between said anodes and ground, a capacitor connected between said cathodes, a rectifying element connected between the cathode of each of said tubes and ground, and arranged to permit current flow to said capacitor only when the corresponding tube is conductive, means for applying said balanced signals between the grids of said tubes, means for maintaining the space currents of said tubes normally cut off in the presence of said applied signals, means for rendering said tubes conductive at a predetermined time, and output connections from said side of said storage capacitor.

4. In a sampling circuit for operating on balanced signals, a pair of electron tubes each having at least anode, cathode and control grid elements, a source of potential connected between said anodes and ground, signal storage means connected between the cathodes of said electron tubes, rectifiers connected between the cathode of said tubes and ground, the anodes of said rectifiers being connected respectively to the cathodes of said electron tubes, means for maintaining the space currents of said electron tubes normally cut off, means for rendering said tubes conductive at predetermined intervals to permit current flow to said signal storage means, and output connections for applying the potential across said signal storage means to an external circuit.

5. In a circuit for sampling the amplitude of a wave form available as a balanced signal, a pair of electron tubes each having at least anode, cathode and control grid elements, a source of positive potential connected between said anodes and ground, a storage capacitor connected between said cathodes, separate connections between said cathodes and ground arranged to permit current flow to said storage capacitor only when the corresponding tube is conducting, means for applying said balanced signal between the grids of said tubes, a source of bias voltage for the grids of said tubes of sufficient amplitude to cut off the flow of current in said tubes in the presence of the largest positive amplitude of said balanced signals, means for overcoming said bias voltage at periodic intervals, and an output connection from each side of said storage capacitor.

6. In a sampling circuit for operating on balanced signals, a pair of electron tubes each having at least anode, cathode and control grid elements, a source of positive potential connected between said anodes and ground, a storage capacitor connected between the cathodes of said electron tubes, output connections from each of said cathodes, rectifying elements connecting each of said cathodes to ground to permit current flow to said capacitor only when the corresponding cathode is positive with respect to ground, means for applying sampling pulses superimposed upon a cut-off bias voltage to the control grids of both of said tubes, said cut-off bias voltage being of sufficient amplitude to render said tubes normally non-conducting and said sampling pulses being of sufficient amplitude to overcome said bias voltage and render said tubes conductive for the duration of said sampling pulses and means for applying a balanced signal to be sampled between the control grids of said tubes.

7. In a circuit for sampling the amplitude of a balanced complex wave, a pair of electron tubes each comprising at least anode, cathode and control grid elements, a storage capacitor connected between the cathodes of said tubes, output connections from each of said cathodes, rectifying elements connecting each of said cathodes to ground to permit current flow to said capacitor only when the corresponding electron tube is conductive, means for applying said balanced wave form between the grids of said electron tubes, means for applying a bias voltage to the grids of said electron tubes to maintain the space currents of said tubes normally cut off in the presence of said applied wave form, and means for applying positive sampling signals to said control grids at periodic intervals, said sampling signals being of sufficient amplitude to render said electron tubes conductive in the presence of the combined cut-off bias and the largest possible negative amplitude of said applied wave.

8. In a sampling circuit for operating on balanced signals, a pair of cathode follower tubes each having at least anode, cathode and control grid elements and the cathode circuits of each tube including a rectifying element arranged to complete the cathode circuit only when said cathode follower becomes conductive, a storage capacitor connected between said cathodes, means for applying said balanced signals between the control grids of said cathode followers, means normally effective to maintain the space currents of said cathode follower tubes cut off in the presence of said balanced signals and means for applying a series of sampling pulses to the control grids of said cathode follower tubes to render said cathode followers periodically conductive.

9. In a circuit for operating on balanced signals, a pair of electron tubes each having at least anode, cathode and control grid elements, a source of anode potential for said tubes, a storage capacitor connected between the cathodes of said tubes, connections between said cathodes and ground arranged to permit current flow to said capacitor only when the corresponding tube is conductive, means for applying said balanced signal between the grids of said tubes, means for maintaining the space currents of said tubes normally cut off in the presence of said signals, means for rendering said tubes conductive at predetermined instants, and means for equalizing the current flow through said tubes produced by said last-mentioned means when the balanced signals are of zero amplitude.

10. In a circuit for operating on balanced signals, a pair of electron tubes each having at least anode, cathode and control grid elements, a source of anode potential for said tubes, a storage capacitor connected between the cathodes of said tubes, connecitons between said cathodes and ground arranged to permit current flow to said capacitor only when the corresponding tube is conductive, means for applying said balanced signal between the grids of said tubes, means for maintaining the space currents of said tubes normally cut off in the presence of said signals, means for rendering said tubes conductive at predetermined instants, and means for compensating the leakage currents flowing to said storage capacitor through the grid-cathode capacitances of said electron tubes during the normally cut-off periods.

11. In a circuit for operating on balanced signals, a pair of electron tubes each having at least anode, cathode and control grid elements, a source of anode potential for said tubes, a storage capacitor connected between the cathodes of said tubes, connections between said cathodes and ground arranged to permit current flow to said capacitor only when the corresponding tube is conductive, means for applying said balanced signal between the grids of said tubes, means for maintaining said tubes normally cut off in the presence of said signals, means for rendering said tubes conductive at predetermined instants and compensating capacitances cross-connected between the cathodes and control grids of said electron tubes, the capacitances being connected in each case between the control grid of one of said electron tubes and the cathode of the opposite electron tube.

12. In a sampling circuit for operating on balanced signals, a pair of electron tubes each having at least an anode, a cathode and a control grid, a source of positive potential connected between said anodes and ground, a capacitor connected between the cathodes of said electron tubes, rectifying elements connecting each of said cathodes to ground to permit current flow to said capacitor only when the corresponding cathode is positive in respect to ground, means for applying sampling pulses superimposed upon the cut-off bias voltage to the control grids of both of said tubes, said sampling pulses being of sufficient amplitude to overcome said bias and render said tubes conductive for the duration of said sampling pulses, and means for adjusting the relative amplitudes of both sampling pulses and cut-off bias to balance the sampling circuit.

LUTHER W. HUSSEY.

REFERENCES CITED

The following references are of record in the file of this patent:

UNITED STATES PATENTS

| Number | Name | Date |
| --- | --- | --- |
| 2,335,265 | Dodington | Nov. 30, 1943 |
| 2,350,008 | Artzt | May 30, 1944 |